United States Patent
Griffin et al.

(10) Patent No.: US 9,288,888 B2
(45) Date of Patent: *Mar. 15, 2016

(54) PLASMA TORCH WITH REVERSIBLE BAFFLE

(71) Applicant: The ESAB Group, Inc., Florence, SC (US)

(72) Inventors: David Charles Griffin, Florence, SC (US); Gregory William Diehl, Florence, SC (US); Christopher Reed Martin, Florence, SC (US); Wayne Stanley Severence, Jr., Florence, SC (US)

(73) Assignee: The ESAB Group, Inc., Florence, SC (US)

(*) Notice: Subject to any disclaimer, the term of this patent is extended or adjusted under 35 U.S.C. 154(b) by 154 days.

This patent is subject to a terminal disclaimer.

(21) Appl. No.: 14/137,148

(22) Filed: Dec. 20, 2013

(65) Prior Publication Data

US 2014/0217069 A1 Aug. 7, 2014

Related U.S. Application Data

(63) Continuation-in-part of application No. 13/348,281, filed on Jan. 11, 2012, now Pat. No. 8,624,149.

(51) Int. Cl.
| | |
|---|---|
| *B23K 10/00* | (2006.01) |
| *H05H 1/34* | (2006.01) |
| *B23K 9/29* | (2006.01) |
| *H05H 1/24* | (2006.01) |

(52) U.S. Cl.
CPC .................. *H05H 1/34* (2013.01); *B23K 9/296* (2013.01); *B23K 10/00* (2013.01); *H05H 1/341* (2013.01); *H05H 1/24* (2013.01); *H05H 2001/3442* (2013.01); *H05H 2001/3457* (2013.01); *H05H 2001/3468* (2013.01)

(58) Field of Classification Search
CPC ........... H05H 1/34; H05H 1/341; H05H 1/24; H05H 1/26; H05H 2001/3468; H05H 2001/3457; H05H 2001/3442; B23K 9/296
USPC ............... 219/121.48, 121.49, 121.39, 121.5, 219/121.51, 121.55, 75; 313/231.41, 313/231.51
See application file for complete search history.

(56) References Cited

U.S. PATENT DOCUMENTS

| | | | |
|---|---|---|---|
| 3,667,371 A | 6/1972 | Russell | |
| 4,207,925 A * | 6/1980 | Nelson | 138/44 |
| 5,275,735 A | 1/1994 | Stearns | |
| 5,680,014 A | 10/1997 | Miyamoto et al. | |
| 6,215,090 B1 * | 4/2001 | Severance et al. | 219/121.48 |
| 8,258,423 B2 | 9/2012 | Severance, Jr. et al. | |
| 8,624,149 B2 | 1/2014 | Griffin et al. | |
| 2007/0138148 A1 * | 6/2007 | Severance, Jr. | 219/121.48 |
| 2013/0175244 A1 | 7/2013 | Griffin et al. | |

* cited by examiner

*Primary Examiner* — Mark Paschall
(74) *Attorney, Agent, or Firm* — Kacvinsky Daisak Bluni PLLC

(57) ABSTRACT

A plasma arc torch includes an annular baffle defining distinct faces A, B, C, and D. Faces A and C are opposite from each other, and faces B and D are opposite from each other. First passages for fluid flow extend between the faces A and C, and second passages extend between the faces B and D. The baffle is installable in an annular space between an inner wall and an outer wall, in either of two orientations. In a first orientation, the first passages are open to fluid flow and the second passages are closed by engagement of the inner and outer walls with the faces B and D, and in a second orientation, flipped over relative to the first orientation, the second passages are open to fluid flow and the first passages are closed by engagement of the inner and outer walls with the faces A and C.

27 Claims, 10 Drawing Sheets

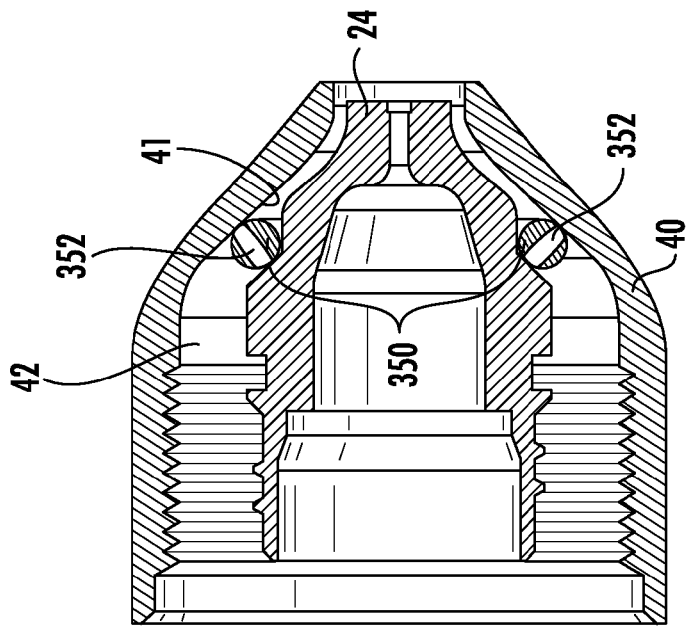
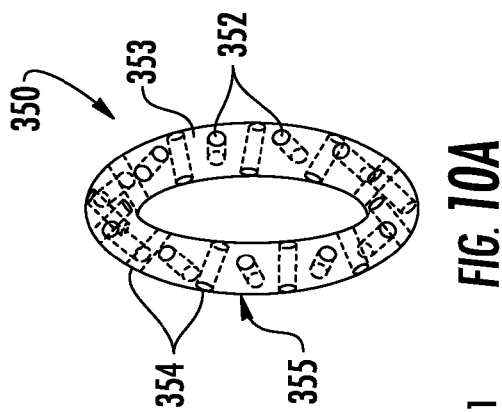
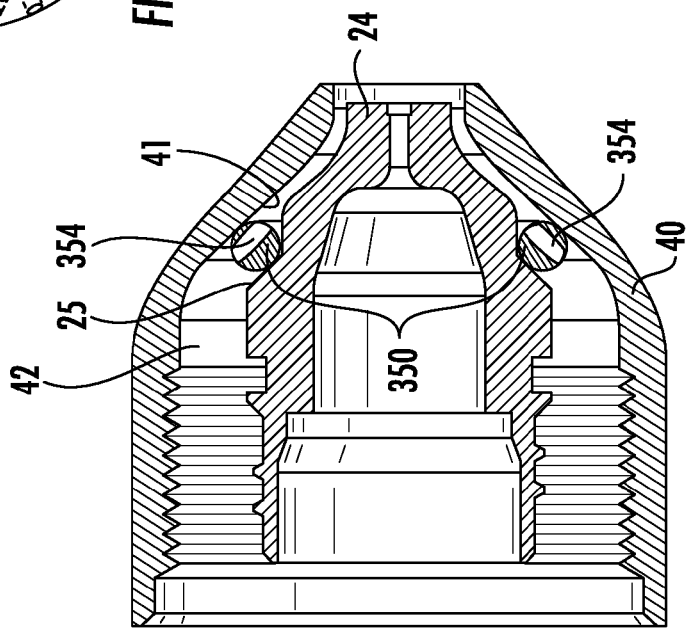

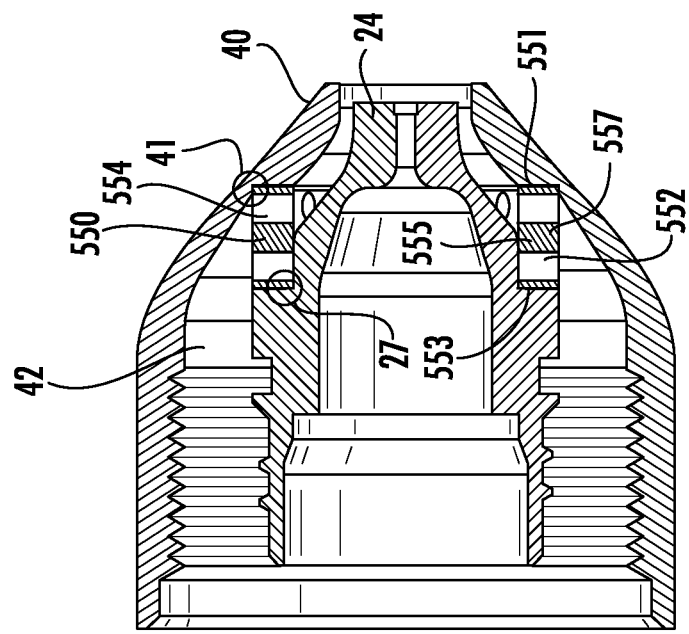
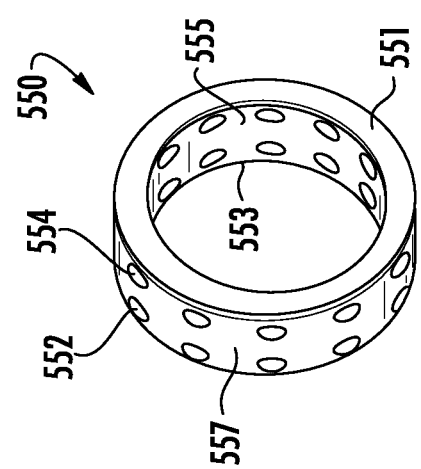

PLASMA TORCH WITH REVERSIBLE BAFFLE

CROSS-REFERENCE TO RELATED APPLICATIONS

This is a Continuation-In-Part Application of pending U.S. non-provisional patent application Ser. No. 13/348,281 filed Jan. 11, 2012, the entirety of which application is incorporated by reference herein.

FIELD

The present application relates to plasma arc torches in general, and more particularly to a reversible baffle arrangement for plasma arc torches.

BACKGROUND

Plasma torches are commonly used for cutting, welding, or marking metal work pieces. In general, plasma torches employ an electrode to generate an electric arc within the torch. A high-velocity gas is flowed through the torch, and the electric arc ionizes the gas, creating a plasma. The high-velocity stream of ionized gas, or plasma, is delivered through a nozzle of the torch towards the work piece that is to be operated upon. The plasma serves to conduct electricity from the torch to the work piece. In this way, the plasma heats the work piece, melting the metal in the desired location.

Baffles are commonly used in plasma arc torches to control the flow of gases or liquids. Baffles can be used, for example, to throttle the flow and/or to impart swirl to the flow. Swirl-inducing baffles are generally referred to as swirl baffles, or alternatively as diffusers.

A common type of swirl baffle is an annular ring having flow passages extending between the radially inner and outer surfaces of the ring. The passages extend non-radially, i.e., with a tangential component of direction, so that swirl is imparted to the fluid flowing through the passages. Some swirl baffles of this type have a configuration that allows them to be inadvertently installed upside down relative to the proper orientation. When the swirl baffle is incorrectly installed upside down, the swirl direction imparted by the baffle is the opposite of the intended direction. This can cause problems in some cases, such as when a downstream component's design is such that it works properly only when it receives swirl of a particular sense.

SUMMARY

Embodiments of the present invention described herein address the above-noted issue, and some embodiments provide additional/different functionalities that can be advantageous in plasma arc torches and processes.

In one exemplary embodiment, a plasma arc torch is described, comprising a main torch body, an electrode, and a nozzle, a generally annular fluid flow passage being defined within the torch between a radially inner wall and a radially outer wall for flow of a fluid therethrough. The torch further comprises a generally annular baffle disposed in the generally annular fluid flow passage and engaging the radially inner and radially outer walls thereof. The baffle defines distinct faces A, B, C, and D, a set of first passages extending between the faces A and C, and a set of second passages extending between the faces B and D.

The faces of the baffle and the radially inner and outer walls of the annular fluid flow passage are configured to cooperate such that in a first orientation of the baffle the first passages are open to fluid flow and the second passages are closed to fluid flow by engagement of the radially inner and outer walls with the faces B and D. In a second orientation of the baffle, flipped over relative to the first orientation, the second passages are open to fluid flow and the first passages are closed to fluid flow by engagement of the radially inner and outer walls with the faces A and C.

The annular flow passage and baffle as described above can be configured in any of various ways to achieve various objectives. For example, in one embodiment, the first passages are configured to provide a first flow characteristic to the fluid flowing therethrough, and the second passages are configured to provide a second flow characteristic to the fluid flowing therethrough, the first and second flow characteristics differing from each other. The flow characteristic can be, for example, flow rate. Thus, when the baffle is installed in the first orientation, a first flow rate can be imparted by the baffle. When the baffle is flipped over and installed in the second orientation, the baffle can impart a second flow rate that is higher or lower than the first flow rate.

Alternatively the flow characteristic can be swirl magnitude and/or swirl direction. Thus, in another embodiment, the first passages are configured to impart swirl of a first magnitude and a first direction to the fluid flowing therethrough, and the second passages are configured to impart swirl of a second magnitude and a second direction to the fluid flowing therethrough. Various baffle configurations are possible. As one example, the baffle passages can be configured such that the first and second directions of the swirl are the same. That is, with the baffle installed in either of its two possible orientations (right side up or upside down), the resulting swirl direction is the same. The first and second magnitudes of the swirl can also be the same, such that the baffle is completely reversible without affecting performance in any way. In this manner, it is impossible to inadvertently install the baffle in a way that will adversely affect the torch operation.

Alternatively, it is possible to configure the passages so that the swirl is greater in one orientation than in the other, which may be useful in cases where it is desirable to use the same torch for different processes having different optimum swirl levels.

The baffle can be configured in various other ways. For example, each of the first passages can comprise a surface groove extending between the faces A and C, and each of the second passages can comprise a surface groove extending between the faces B and D.

Alternatively, each of the first passages can comprise a hole extending between the faces A and C, and each of the second passages can comprise a hole extending between the faces B and D.

In some embodiments, each of the faces A, B, C, and D of the baffle can be substantially conical, and the radially inner and outer walls of the generally annular fluid flow passage can define substantially conical surfaces, the substantially conical faces of the baffle engaging the substantially conical surfaces of the walls so as to radially center the baffle with respect to the walls. This can also serve to radially locate other components. For example, the inner wall of the annular fluid flow passage can be part of an inner component (e.g., a primary nozzle) and the outer wall can be part of an outer component (e.g., a secondary or shield nozzle) that surrounds the inner component. The conical surfaces of these components and the baffle can serve to radially center all of them with respect to one another.

The radial centering of the baffle relative to the torch components defining the generally annular fluid flow passage has utility more generally with any baffle, including those that do not have two sets of passages. In accordance with one embodiment of the invention, a plasma arc torch comprises a main torch body, an electrode, and a nozzle, a generally annular fluid flow passage being defined between a radially inner wall and a radially outer wall for flow of a fluid therethrough, the torch further comprising a generally annular baffle disposed in the generally annular fluid flow passage and engaging the radially inner and radially outer walls thereof, the baffle defining flow passages therethrough, and wherein each of the radially inner and outer walls of the generally annular fluid flow passage defines a substantially conical surface, and the baffle defines an inner conical surface and an outer conical surface, the inner and outer conical surfaces of the baffle respectively engaging the substantially conical surfaces of the inner and outer walls of the generally annular fluid flow passage so as to radially center the baffle with respect to the walls.

A gas baffle is disclosed for a plasma torch. The gas baffle can include an annular member having a plurality of first and second gas passages, wherein the plurality of first and second gas passages are arranged such that when the annular member is installed in a first orientation in the plasma torch the first set of gas passages are open to gas flow therethrough and the second set of gas passages are blocked by engagement of one or more baffle walls. The plurality of first and second gas passages can also be arranged such that when the annular member is installed in a second orientation in the plasma torch the second set of passages are open to gas flow and the first set of gas passages are blocked by engagement of one or more baffle walls. In some embodiments, the first and second sets of gas passages may only be partially formed by the annular member. The annular member may be configured to be disposed between a nozzle and a shield of the plasma torch, the resulting arrangement configured to modify a flow of shield gas. Alternatively, the annular member may be configured to be disposed between a nozzle and an electrode of the plasma torch, the resulting arrangement configured to modify a flow of plasma gas. In some embodiments, the nozzle may include a conical surface for concentrically engaging the annular member. In some embodiments, the shield may include a conical surface for concentrically engaging the annular member. An electrode assembly is also disclosed for use with the aforementioned gas baffle. The electrode assembly may include a conical surface for concentrically engaging the annular member.

Additional embodiments of the invention and/or advantages achievable thereby are described herein or would be obvious to persons of ordinary skill in the art.

BRIEF DESCRIPTION OF THE DRAWINGS

Figure 1:
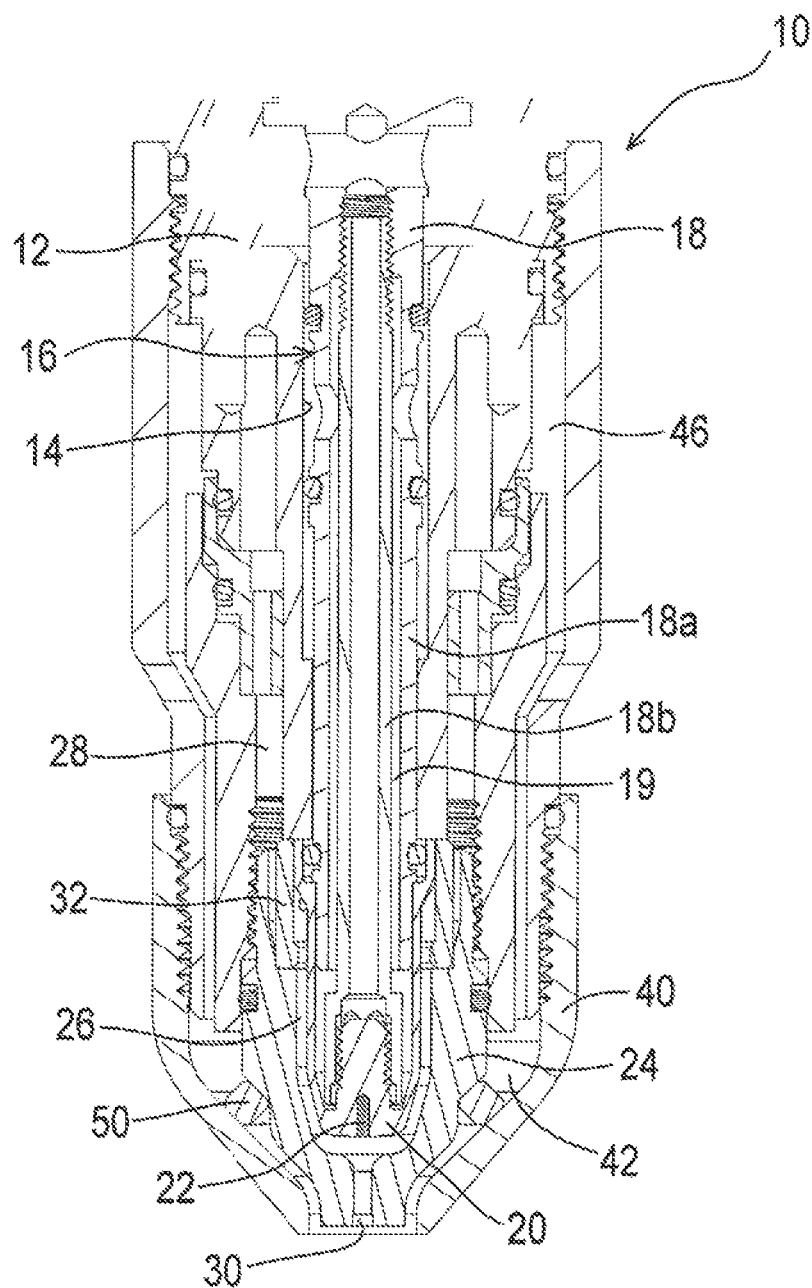
Figure 1A:
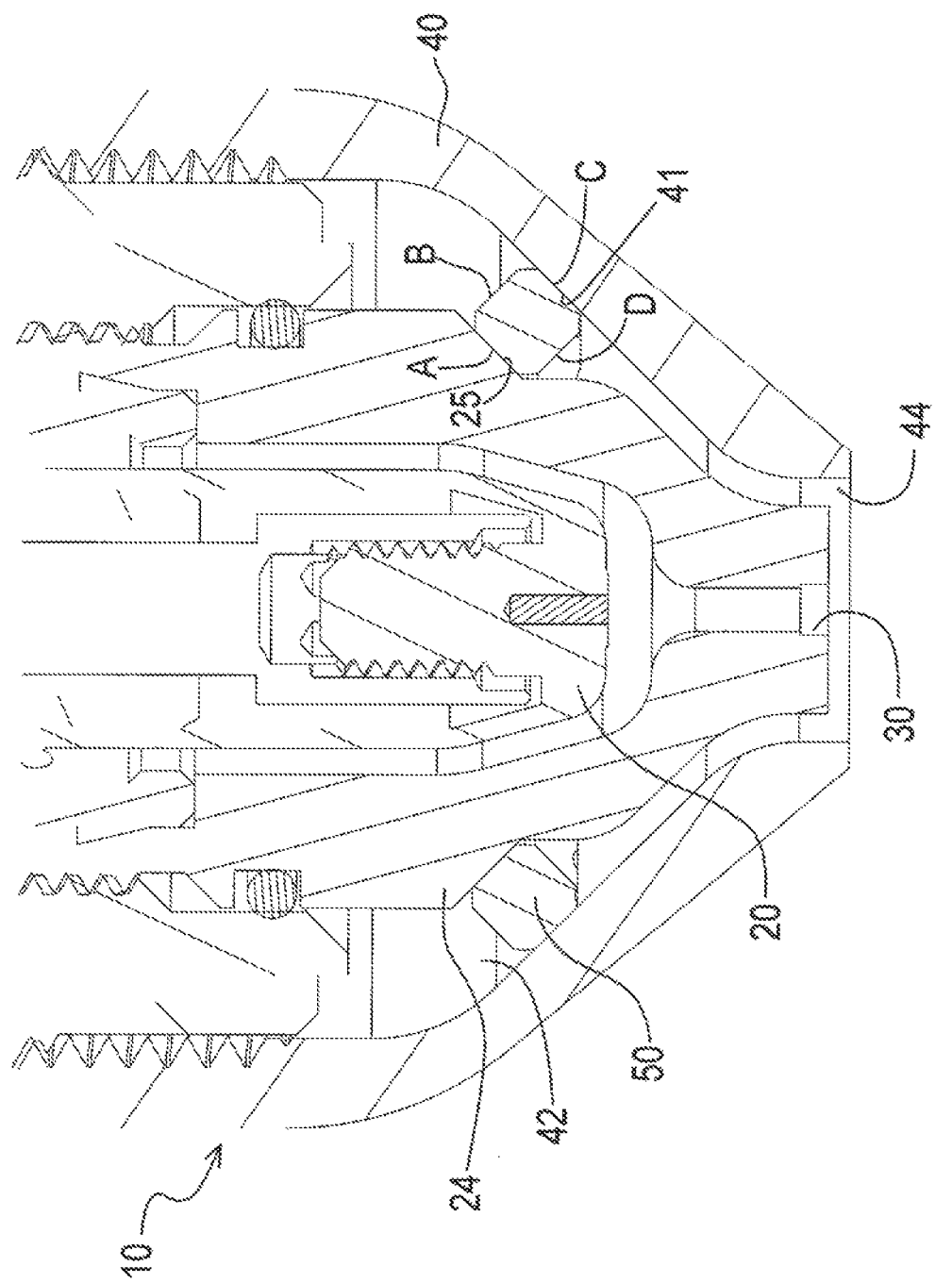
Figure 2:
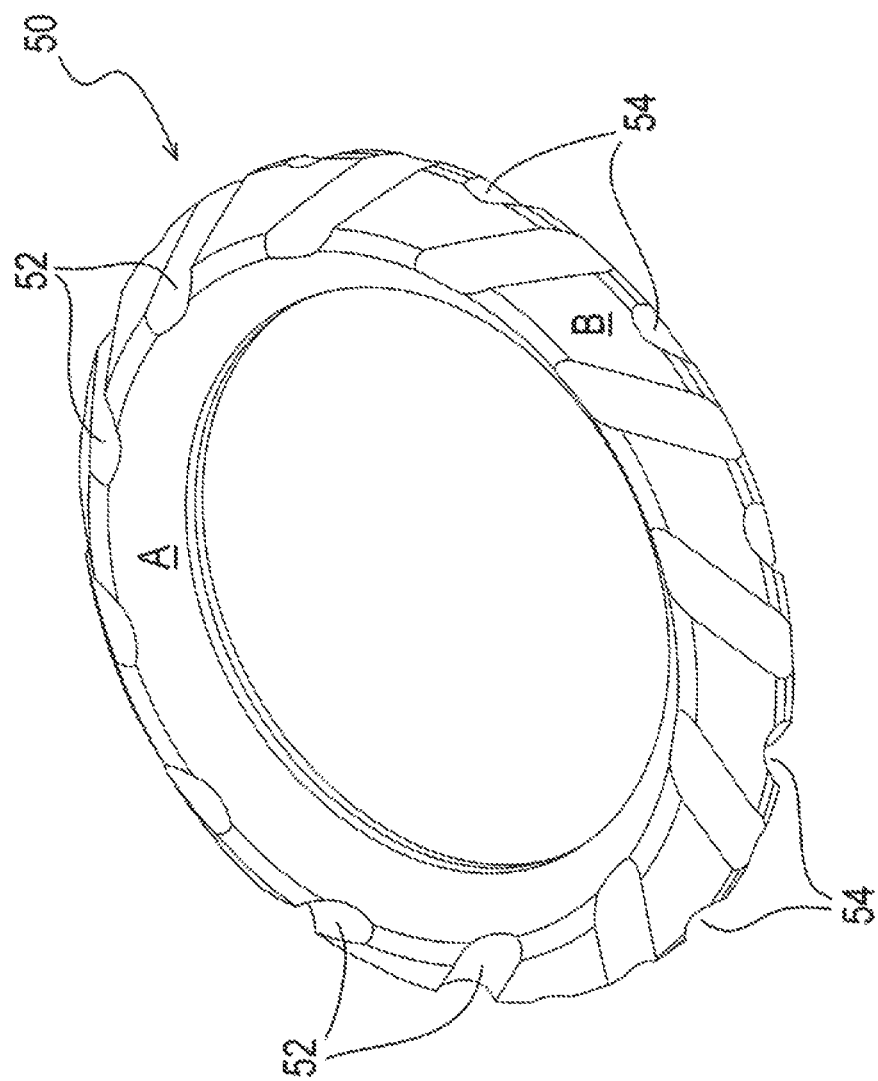
Figure 3:
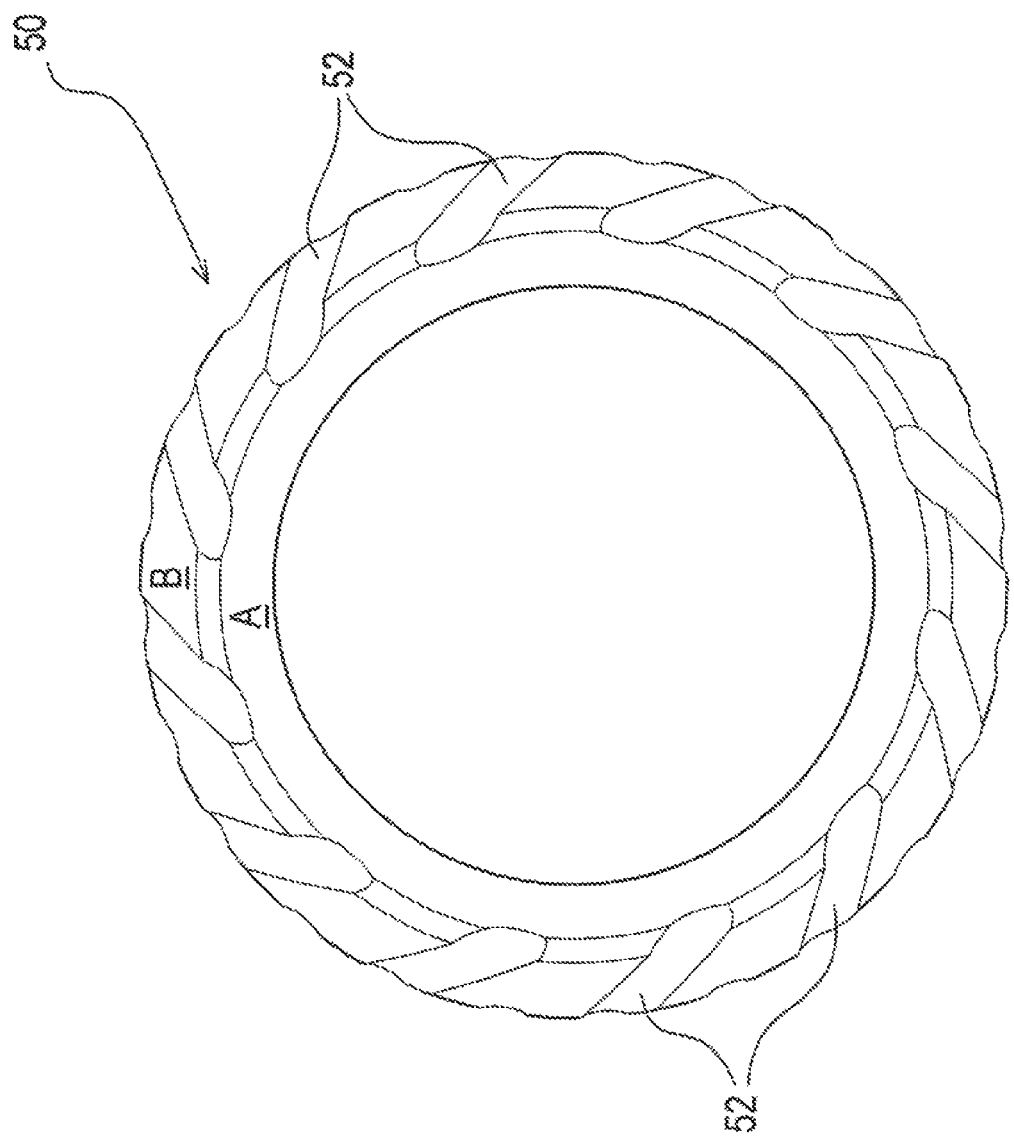
Figure 5:
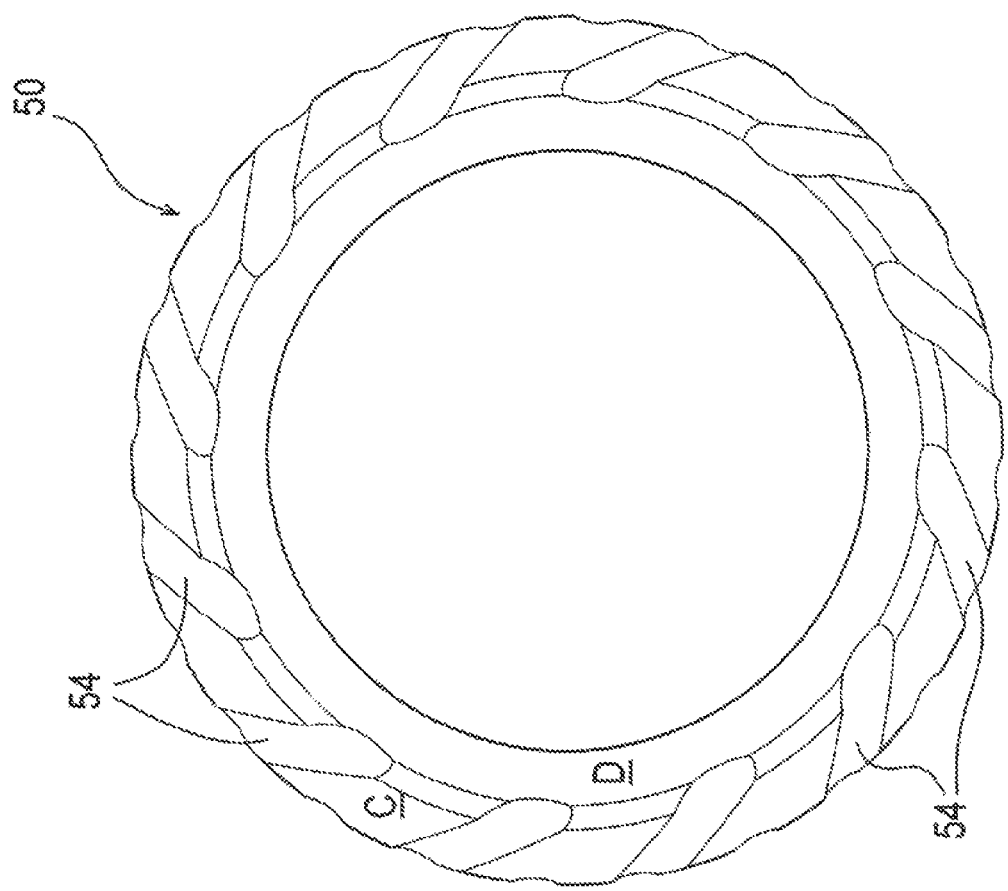
Figure 4:
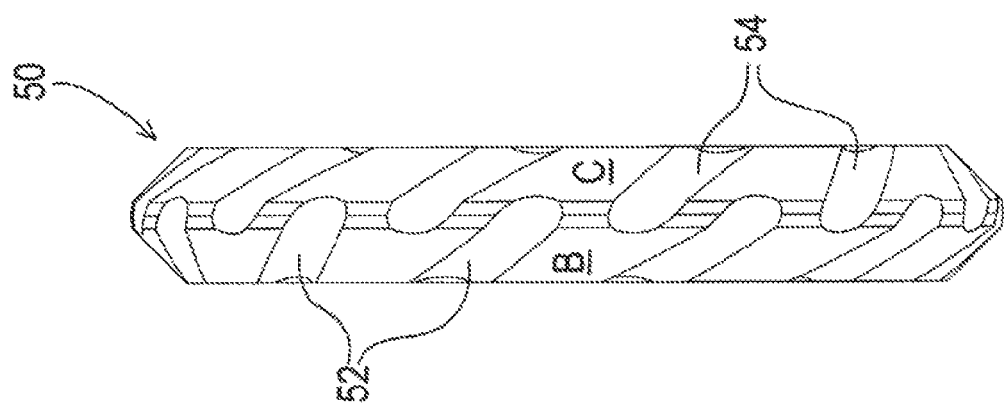
Figure 8:
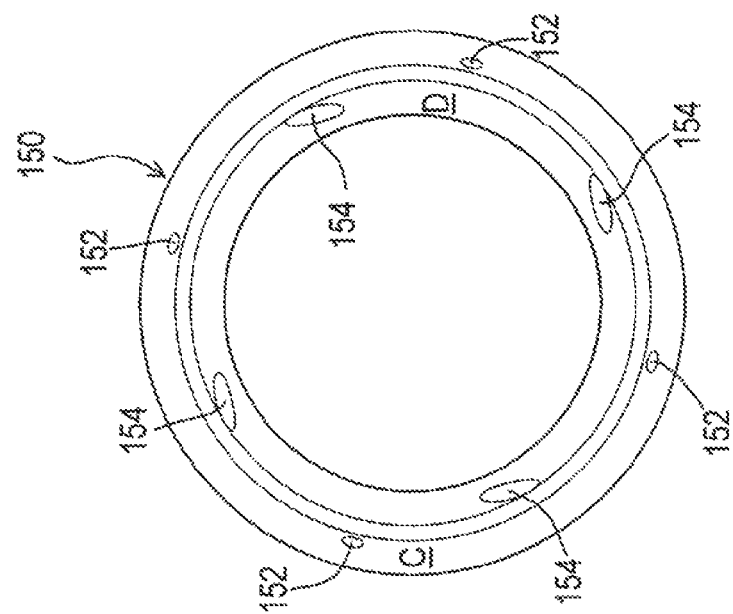
Figure 7:
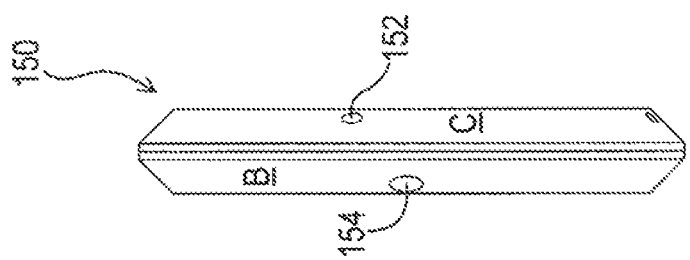
Figure 6:
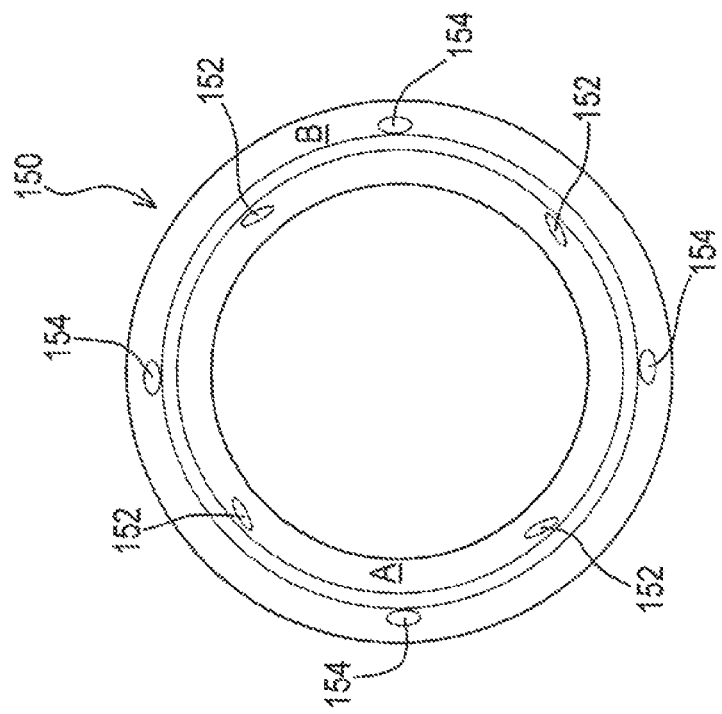
Figure 9C:
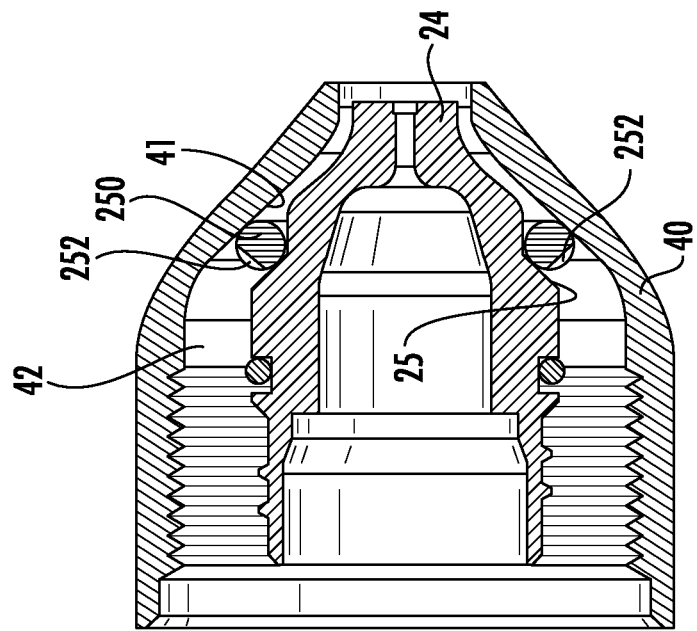
Figure 9A:
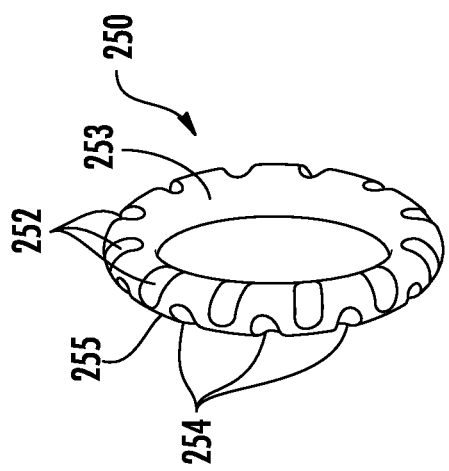
Figure 9B:
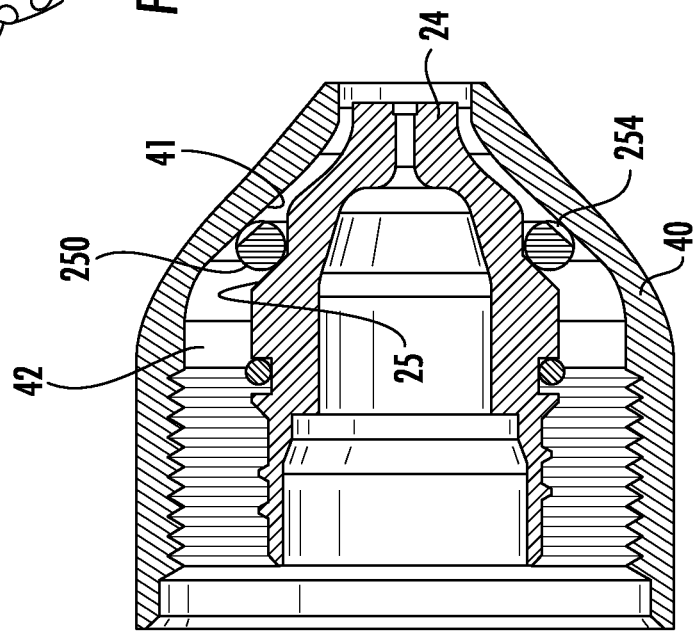
Figure 11C:
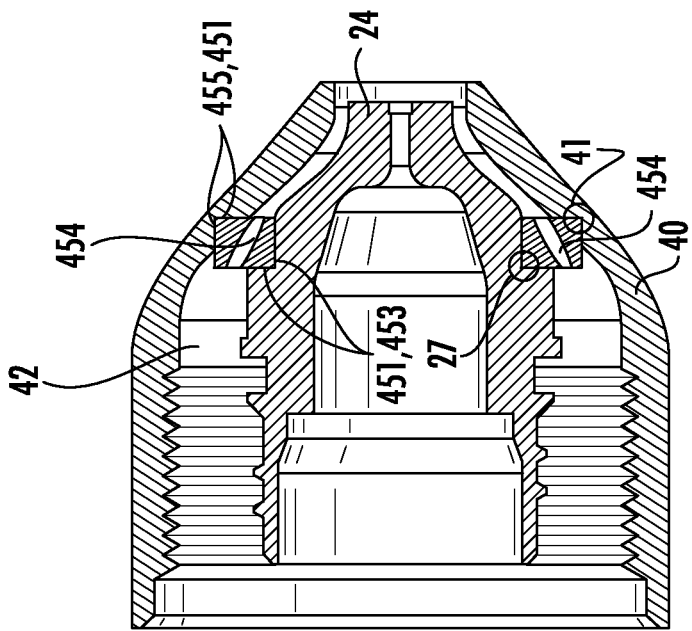
Figure 11A:
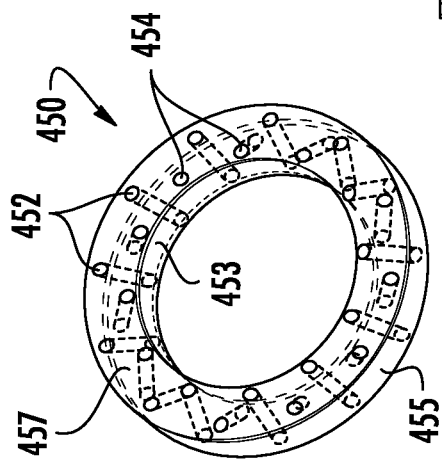
Figure 11B:
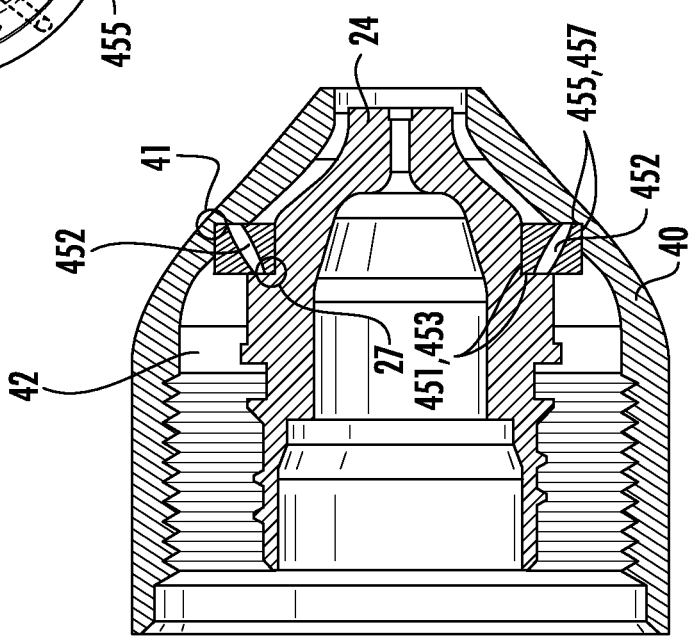

Having thus described the invention in general terms, reference will now be made to the accompanying drawings, which are not necessarily drawn to scale, and wherein:

FIG. 1 is a cross-sectional view of a plasma arc torch in accordance with one embodiment of the invention;

FIG. 1A is an enlarged portion of FIG. 1;

FIG. 2 is a perspective view of a baffle used in the torch of FIG. 1;

FIG. 3 is a top view of the baffle;

FIG. 4 is a side view of the baffle;

FIG. 5 is a bottom view of the baffle;

FIG. 6 is a top view of a baffle in accordance with another embodiment;

FIG. 7 is a side view of the baffle of FIG. 6;

FIG. 8 is a bottom view of the baffle of FIG. 6;

FIG. 9A is a perspective view of an alternative baffle used in an embodiment of the torch of FIG. 1; FIG. 9B is a partial cross-section view of the baffle of FIG. 9A positioned in the torch of FIG. 1; FIG. 9C is a partial cross-section view of the baffle of FIG. 9A positioned in the torch of FIG. 1 and rotated 90-degrees from the position shown in FIG. 9B;

FIG. 10A is a perspective view of an alternative baffle used in an embodiment of the torch of FIG. 1; FIG. 10B is a partial cross-section view of the baffle of FIG. 10A positioned in the torch of FIG. 1; FIG. 10C is a partial cross-section view of the baffle of FIG. 10A positioned in the torch of FIG. 1 and rotated 90-degrees from the position shown in FIG. 10B FIG. 11A is a perspective view of an alternative baffle used in an embodiment of the torch of FIG. 1; FIG. 11B is a partial cross-section view of the baffle of FIG. 11A positioned in the torch of FIG. 1; FIG. 11C is a partial cross-section view of the baffle of FIG. 11A positioned in the torch of FIG. 1 and rotated 90-degrees from the position shown in FIG. 11B; and FIG. 12A is a perspective view of an alternative baffle used in an embodiment of the torch of FIG. 1; FIG. 12B is a partial cross-section view of the baffle of FIG. 12A positioned in the torch of FIG. 1;

DETAILED DESCRIPTION

Embodiments of the present invention now will be described more fully hereinafter with reference to the accompanying drawings, in which some but not all embodiments are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

A plasma torch 10 in accordance with an embodiment of the present invention is shown in FIG. 1. The torch includes a main torch body 12 having a central bore 14 through which an electrode assembly 16 extends. The electrode assembly 16 comprises an electrode holder 18 having an outer tubular member 18a and an inner tubular member 18b between which an annular space 19 is defined. The inner tubular member 18b comprises a coolant tube whose upper end is externally threaded for engaging internal threads in the outer tubular member 18a. The lower end of the coolant tube 18b is internally threaded for receiving an externally threaded nipple of an electrode 20. The electrode 20 has a front face in which an emissive element 22 is embedded. The emissive element 22 is operable to emit an electric arc when a voltage potential difference is created between the electrode 20 and another member to which the arc extends. Coolant supplied into the coolant tube 18b circulates around the back (interior) side of the electrode 20 to cool the electrode.

The torch 10 further includes a primary nozzle 24 that surrounds the electrode 20 and is electrically isolated from the electrode. An annular gas flow passage 26 is defined between the nozzle 24 and the electrode 20. Gas is fed to the passage 26 via a gas supply passage 28 defined in the torch. The nozzle 24 defines an orifice 30 through which the gas is discharged toward a workpiece. A swirl baffle 32 disposed between the nozzle 24 and the electrode assembly 16 imparts swirl to the gas flowing from the passage 28 into the passage 26, so that the gas discharged from the nozzle orifice 30 is a swirling jet that surrounds the electric arc emitted from the emissive element 22.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are in the tended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

A secondary nozzle, or shield, 40 surrounds the primary nozzle 24 and there is an annular fluid flow passage 42 between them. The shield 40 defines an orifice 44 for discharge of shield fluid toward the workpiece. A secondary or shield fluid is supplied to the passage 42 from a shield fluid supply passage 46 defined in the torch. The shield fluid can be a gas or can be a liquid such as water, depending on the intended application of the torch.

A baffle 50 is disposed in the annular passage 42 between the nozzle 24 and the shield 40. The baffle 50 is generally annular and defines passages for flow of the shield fluid. With reference to FIGS. 1A, 2, 3, 4, and 5, the baffle 50 includes four distinct faces A, B, C, and D, each of which is substantially conical in the illustrated embodiment. The faces A and C lie opposite each other, and the faces B and D lie opposite each other. Faces A and D face generally radially inwardly, and faces B and D face generally radially outwardly.

The nozzle 24 defines a substantially conical wall 25 (FIG. 1A) and the shield 40 defines a substantially conical wall 41 opposite from the wall 25. The nozzle wall 25 is configured to lie flat against the face A of the baffle, and the shield wall 41 is configured to lie flat against the face C of the baffle. Additionally, the baffle is configured to be reversible in orientation (i.e., flipped over relative to the orientation shown in FIG. 1A). In the flipped-over orientation, the nozzle wall 25 lies flat against the face D and the shield wall 41 lies flat against the face B.

With reference to FIGS. 2 through 5, the baffle 50 defines a set of first passages 52 that extend between the faces A and C, and a set of second passages 54 that extend between the faces B and D. In the embodiment of FIGS. 2-5, the first passages 52 comprise surface grooves formed in the face B and of sufficient depth to extend partially into the faces A and C. Similarly, the second passages 54 comprise surface grooves formed in the face C and of sufficient depth to extend partially into the faces B and D.

When the baffle 50 in installed in the orientation shown in FIG. 1A, the nozzle wall 25 and shield wall 41 close off the first passages 52, but the second passages 54 are open for fluid flow. If the baffle is flipped over to its opposite orientation, then the walls 25 and 41 close off the second passages 54, but the first passages 52 are open for fluid flow.

This reversibility of the baffle 50 can be employed for various effects or advantages. One such advantage, possessed by the illustrated baffle 50, is the ability to install the baffle in either of its two possible orientations without changing the manner in which the baffle affects the flow of fluid through it. That is, the baffle is "fool-proof" such that it cannot be inadvertently installed in the "wrong" orientation. In this regard, the baffle 50 is illustrated as being configured to impart swirl to the fluid passing through the passages that are active. The passages 52 and the passages 54 are configured to be identical in size and orientation when either one set or the other is the active set. Thus, in the first orientation as illustrated in FIG. 1A, the second passages 54 are active and impart swirl of a predetermined direction and magnitude (where "direction" is either clockwise or counterclockwise, and "magnitude" is the absolute value of the swirl angle with respect to axial). In the second orientation (flipped over relative to that of FIG. 1A), the first passages 52 are active and impart the very same direction and magnitude of swirl.

With respect to FIGS. 6 through 8, a baffle 150 in accordance with another embodiment is illustrated. The baffle 150 is similar in overall configuration to the previously described baffle, and thus has distinct faces A, B, C, and D arranged as in the prior embodiment. In this embodiment, however, the first passages 152 are holes rather than surface grooves, and they extend between the faces A and C. Likewise, the second passages 154 are holes rather than surface grooves, and they extend between the faces B and D. A further difference relative to the prior embodiment is that the first passages 152 and the second passages 154 are not configured to produce identical flow results. Instead, the first passages 152 are of smaller cross-sectional flow area than the second passages 154. The advantage of this configuration is that the baffle 150 allows the user to adjust the level of shield fluid delivered through the shield orifice 44. If in a particular process a relatively low shield fluid flow rate is desired, the baffle can be installed in the orientation in which the first (smaller) passages 152 are the active ones. If in another process a higher shield fluid flow rate is desired, then the baffle can be flipped over so the second (larger) passages 154 are the active ones.

It will also be clear from the foregoing that the two sets of passages can be configured to vary other fluid flow characteristics instead of or in addition to the flow rate. For example, the passages may be configured so that in the first orientation the baffle provides swirl at a relatively low swirl angle, and in the second orientation the baffle provides swirl at a relatively higher swirl angle.

While the baffles 50 and 150 illustrated herein are configured to produce swirl, it will be recognized that the invention is applicable to other situations where swirl may not be required or desired. Thus, the passages in the baffle can be oriented to produce flow without swirl. In this case, the baffle can be "fool-proof" as previously described, such that both sets of passages produce identical flow results. Alternatively, the baffle can have differently configured sets of passages so as to provide a flow-adjusting function depending on its orientation.

Many modifications and other embodiments of the invention set forth herein will come to mind to one skilled in the art to which this invention pertains having the benefit of the teachings presented in the foregoing descriptions and the associated drawings. For example, while the illustrated and described baffles 50, 150 have four conical faces A, B, C, and D, baffles in accordance with the invention can have one or more faces that are not conical (e.g., cylindrical).

Referring to FIG. 9A, a further embodiment of a reversible baffle 250 is shown. FIGS. 9B and 9C show the baffle 250 disposed in the annular passage 42 between the nozzle 24 and the shield 40. The baffle 250 is generally annular and defines passages for flow of the shield fluid. In contrast to the baffles of the prior embodiments, the baffle 250 does not include distinct faces, but rather is circular in cross-section. The nozzle 24 defines a substantially conical wall 25 (FIGS. 9B, 9C) and the shield 40 defines a substantially conical wall 41 opposite from the wall 25. Thus arranged, the baffle 250 is captured between the conical wall 25 of the nozzle 24 and the conical wall 41 of the shield 40.

The benefit of this design is that the conical walls 25, 41 of the nozzle 24 and shield 40 engage the baffle 250 to center the shield to the nozzle during installation. That is, when the annular baffle is disposed between the conical wall 25 of the nozzle 24 and the conical wall 41 of the shield 40, the nozzle and the shield are automatically positioned with a predetermined concentricity with respect to each other. Thus, the pieces themselves (baffle, nozzle, shield) are self-aligning owing to the interaction between the conical surfaces of the nozzle 24 and shield 40 and the circular cross-section of the baffle 250. This arrangement allows the individual pieces to be manufactured with looser tolerances, since the conical and circular surfaces perform the tight alignment function. As a result, manufacturing costs can be reduced while still maintaining desired tight alignment of the assembled torch components.

The baffle 250 includes a set of first passages 252 that extend across a first side 253 of the baffle 250, and a set of second passages 254 that extend across a second side 255 of the baffle. In the illustrated embodiment, the first passages 252 comprise surface grooves formed in the first side 253 while the second passages 54 comprise surface grooves formed in the second side 255. When the baffle 250 is installed in the orientation shown in FIGS. 9B, 9C (the FIG. 9C view being rotated 90-degrees with respect to the FIG. 9B view), the nozzle wall 25 and shield wall 41 close off the first passages 252, but the second passages 254 are open for fluid flow. As can be seen in FIG. 9B, when the baffle 250 is installed between the nozzle 24 and the shield 40, the conical wall 41 of the shield defines a portion of the passageway in the baffle (along with the second passages 254).

The baffle 250 can be configured to be reversible in orientation (i.e., flipped over relative to the orientation shown in FIGS. 9B, 9C) in the manner described in relation to previous embodiments. Thus, when the baffle 250 is flipped over to its opposite orientation (not shown), then the conical walls 25 and 41 close off the second passages 254, but the first passages 252 are open for fluid flow. This reversibility of the baffle 250 can be employed for some or all of the effects or advantages described in relation to prior embodiments. For example, in some embodiments the size, shape and orientation of the first and second passages 252, 254 may be the same to enable a desired operational characteristic regardless of the installation orientation of the baffle 250. In other embodiments, the size, shape and/or alignment of the first passages 252 can be different from the size, shape and/or orientation of the second passages 254 to impart different operational characteristics depending upon the installation orientation of the baffle 250.

Referring to FIG. 10A, a further embodiment of a reversible baffle 350 is shown. FIGS. 10B and 10C show the baffle 350 disposed in the annular passage 42 between the nozzle 24 and the shield 40 in a manner similar to that described in relation to the embodiment of FIGS. 9A-C. Thus, the baffle 350 is generally annular, with a circular cross-section, and passages for flow of the shield fluid. The nozzle 24 defines a substantially conical wall 25 (FIGS. 10B, 10C) and the shield 40 defines a substantially conical wall 41 opposite from the wall 25. Thus arranged, the baffle 350 is captured between the conical wall 25 of the nozzle 24 and the conical wall 41 of the shield 40.

As with the embodiment of FIGS. 9A-C, the benefit of this design is that the conical walls 25, 41 of the nozzle 24 and shield 40 engage the baffle 350 to center the shield to the nozzle during installation. Thus, the pieces themselves (baffle, nozzle, shield) are self-aligning owing to the interaction between the conical surfaces of the nozzle 24 and shield 40 and the circular cross-section of the baffle 350. This arrangement allows the individual pieces to be manufactured with looser tolerances, since the conical and circular surfaces perform the tight alignment function. As a result, manufacturing costs can be reduced while still maintaining desired tight alignment of the assembled torch components.

The baffle 350 includes a first and second sets of passages 352, 354 that extend between first and second sides 353, 355 of the baffle. In the illustrated embodiment, the first and second passages 352, 354 comprise holes that are alternately angled with respect to the first and second sides 353, 355 such that when the baffle 350 is installed in the orientation shown in FIGS. 10B, 10C (the FIG. 10C view being rotated 90-degrees with respect to the FIG. 10B view), the nozzle wall 25 and shield wall 41 close off the first passages 352, while leaving the second passages 354 open for fluid flow.

The baffle 350 can be configured to be reversible in orientation (i.e., flipped over relative to the orientation shown in FIG. 10B, 10C) in the manner described in relation to previous embodiments. Thus, when the baffle 350 is flipped over to its opposite orientation (not shown), then the conical walls 25 and 41 close off the second passages 354, but the first passages 352 remain open for fluid flow. This reversibility of the baffle 350 can be employed for some or all of the effects or advantages described in relation to prior embodiments. For example, in some embodiments the size, shape and orientation of the first and second passages 352, 354 may be the same to enable a desired operational characteristic regardless of the installation orientation of the baffle 350. In other embodiments, the size, shape and/or alignment of the first passages 352 can be different from the size, shape and/or orientation of the second passages 354 to impart different operational characteristics depending upon the installation orientation of the baffle 350.

Referring to FIG. 11A, a further embodiment of a reversible baffle 450 is shown. FIGS. 11B and 11C show the baffle 450 disposed in the annular passage 42 between the nozzle 24 and the shield 40. The baffle 450 is generally cylindrical and defines passages for flow of the shield fluid. The nozzle 24 defines a substantially conical wall having a notch region 27 formed therein (FIGS. 11B, 11C) for receiving first and second adjacent sides 451, 453 of the baffle 350. The shield 40 has a shoulder region 41 positioned opposite the notch region 27 for receiving third and fourth adjacent sides 455, 457 of the baffle 450. The notch region 27 and shoulder region 41 are thus configured to capture the baffle 450 therebetween. The baffle 450 is configured to be reversible in orientation (i.e., flipped over relative to the orientation shown in FIG. 11B, 11C) in the manner described in relation to previous embodiments.

As can be seen, the baffle 450 defines first and second sets of passages 452, 454 that extend between the first and third sides 451, 457 of the baffle 450. In the illustrated embodiment, the first and second passages 452, 454 comprise first and second angled holes formed between the first and third sides 451, 457 of the baffle 450.

Thus arranged, when the baffle 450 is installed in the orientation shown in FIGS. 11B, 11C (the FIG. 11C view being rotated 90-degrees with respect to the FIG. 11B view) the notch region 27 and shoulder region 41 close off the first passages 452, but the second passages 454 are open for fluid flow. If the baffle 450 is flipped over to its opposite orientation (not shown), then the notch region 27 and shoulder region 41 close off the second passages 454, but the first passages 452 are open for fluid flow. This reversibility of the baffle 450 can be employed for some or all of the effects or advantages described in relation to prior embodiments. For example, in some embodiments the size, shape and orientation of the first and second passages 452, 454 may be the same to enable a desired operational characteristic regardless of the installation orientation of the baffle 450. In other embodiments, the size, shape and/or alignment of the first passages 452 can be different from the size, shape and/or orientation of the second passages 454 to impart different operational characteristics depending upon the installation orientation of the baffle 450.

Referring to FIG. 12A, a further embodiment of a reversible baffle 550 is shown. FIG. 12B shows the baffle 550 disposed in the annular passage 42 between the nozzle 24 and the shield 40. The baffle 550 is generally cylindrical and defines passages for flow of the shield fluid. The nozzle 24 defines a substantially conical wall having a notch region 27 formed therein (FIG. 12B) for receiving a first side surface 551 and an outer peripheral surface 557 of the baffle 550. The shield 40 has a shoulder region 41 positioned opposite the notch region 27 for receiving a second side surface 553 and an inner peripheral surface 555 of the baffle 550. The notch region 27 and shoulder region 41 are thus configured to capture the baffle 550 therebetween. The baffle 550 is configured to be reversible in orientation (i.e., flipped over relative to the orientation shown in FIG. 12B) in the manner described in relation to previous embodiments.

As can be seen, the baffle 550 defines first and second sets of passages 552, 554 that extend between the inner and outer peripheral surfaces 555, 557 of the baffle 550. The first set of passages 552 are positioned adjacent to the second side 553 of the baffle 550, while the second set of passages 554 are positioned adjacent to the first side 551 of the baffle. In the illustrated embodiment, the first and second passages 552, 554 comprise holes formed between the inner and outer peripheral surfaces 555, 557 and are oriented perpendicular to those surfaces. It will be appreciated that this is not critical, and the first and second passages 552, 554 may be oriented at oblique angles with respect to the inner and outer peripheral surfaces 555, 557.

Thus arranged, when the baffle 550 is installed in the orientation shown in FIG. 12B, the nozzle closes off the first passages 552, but the second passages 554 are open for fluid flow. If the baffle 550 is flipped over to its opposite orientation (not shown), then the nozzle closes off the second passages 554, but the first passages 552 are open for fluid flow. This reversibility of the baffle 550 can be employed for some or all of the effects or advantages described in relation to prior embodiments. For example, in some embodiments the size, shape and orientation of the first and second passages 552, 554 may be the same to enable a desired operational characteristic regardless of the installation orientation of the baffle 550. In other embodiments, the size, shape and/or alignment of the first passages 552 can be different from the size, shape and/or orientation of the second passages 554 to impart different operational characteristics depending upon the installation orientation of the baffle 550.

It will be appreciated that some or all of the disclosed baffle designs may be implemented as "drop-in" replacements using either circular or oblong cross-sections. Either through-holes or slots can be used, and gas swirl/flow may be selectable based on the orientation of the baffle. It will also be appreciated that the disclosed baffle designs may be equally suited for application as shield gas diffusers and plasma gas swirl baffles.

It will also be appreciated that although various embodiments are disclosed in which gas flow passages are formed in the baffle, that gas flow passages may be formed by the assembly of the baffle with the nozzle and/or the shield. For example, in some embodiments the nozzle and/or the shield may be provided with grooves that are complementary to grooves formed in the baffle so that when the baffle, nozzle and shield are assembled gas flow passages are formed by the interaction of their complementary surfaces. The reversibility features of such an arrangement may be similar or the same as the reversibility features previously described in relation to other embodiments.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A plasma arc torch comprising a main body, an electrode, and a nozzle, a generally annular fluid flow passage defined between a radially inner wall and a radially outer wall for flow of a fluid therethrough, the torch further comprising:
a generally annular baffle disposed in the generally annular fluid flow passage and engaging the radially inner and radially outer walls thereof, wherein at least one of the radially inner and outer walls of the generally annular fluid flow passage defines a substantially conical surface, wherein the baffle comprises an inner surface and an outer surface, the inner and outer surfaces of the baffle respectively engaging the substantially conical surfaces of the inner and outer walls so as to radially center the baffle with respect to the inner and outer walls,
wherein the baffle comprises a plurality of first and second passages, and wherein in a first orientation of the baffle the plurality of first passages are open to fluid flow and the plurality of second passages are closed to fluid flow by engagement of the inner and outer walls with the baffle.

2. The plasma arc torch of claim 1, wherein engaging the baffle with the substantially conical surfaces of the inner and outer walls positions the nozzle and the shield to have a predetermined concentricity with respect to each other.

3. The plasma arc torch of claim 1, wherein the baffle comprises a circular cross section such that the inner and outer surfaces of the baffle are circular.

4. The plasma arc torch of claim 1, wherein in a second orientation of the baffle the plurality of first passages are closed to fluid flow and the plurality of second passages are open to fluid flow by engagement of the inner and outer walls with the baffle inner and outer surfaces.

5. The plasma arc torch of claim 1, wherein the first passages are configured to provide a first flow characteristic to the fluid flowing therethrough, and the second passages are configured to provide a second flow characteristic to the fluid flowing therethrough, the first and second flow characteristics differing from each other.

6. The plasma arc torch of claim 1, wherein the first passages are configured to impart swirl of a first magnitude and a first direction to the fluid flowing therethrough, and the second passages are configured to impart swirl of a second magnitude and a second direction to the fluid flowing therethrough.

7. The plasma arc torch of claim 6, wherein the first and second directions of the swirl are the same.

8. The plasma arc torch of claim 7, wherein the first and second magnitudes of the swirl are the same.

9. The plasma arc torch of claim 1, wherein each of the plurality of first passages comprises a groove formed on a first side of the baffle and each of the plurality of second passages comprises a groove formed on a second side of the baffle, wherein in the first orientation the radially outer walls form the fluid flow channel with the plurality of first passages, and wherein in the second orientation the radially outer walls for the fluid flow channel with the plurality of second passages.

10. The plasma arc torch of claim 9, wherein at least one of the substantially conical surfaces comprises at least one groove that is complementary to the groove of the baffle to form at least one gas flow passage.

11. The plasma arc torch of claim 1, each of the plurality of first and second passages comprising holes formed between any two sides of the baffle.

12. The plasma arc torch of claim 11, wherein each of the plurality of first passages is nonparallel to each of the plurality of second passages.

13. The plasma arc torch of claim 11, wherein at least one of the plurality of first passages is oriented parallel to at least one of the plurality of second passages.

14. A self-aligning nozzle and shield arrangement for a plasma arc torch, comprising:
   a plasma torch nozzle having an outer conical surface;
   an annular baffle having a circular cross-section; and
   a plasma torch shield having an inner conical surface,
   wherein when the annular baffle is disposed between the outer conical surface of the nozzle and the inner conical surface of the shield, the nozzle and the shield have a predetermined concentricity with respect to each other, and wherein the baffle includes a first set of passages having grooves that, in combination with the inner conical surface of the shield, form a first set of fluid flow passages when the baffle is positioned in a first orientation with respect to the plasma torch shield.

15. The self-aligning nozzle and shield arrangement of claim 14, wherein the baffle includes a second set of passages within the baffle or on a surface of the baffle.

16. The self-aligning nozzle and shield arrangement of claim 14, wherein at least one of the inner and outer conical surfaces comprises at least one groove that is complementary to the grooves of the baffle to form at least one gas of said first set of fluid flow passages.

17. The self-aligning nozzle and shield arrangement of claim 15, wherein the second set of passages comprise grooves that, in combination with the inner conical surface of the shield, form a second set of fluid flow passages when the baffle is positioned in a second orientation with respect to the plasma torch shield.

18. The self-aligning nozzle and shield arrangement of claim 17, wherein the baffle comprises a plurality of first passages and a plurality of second passages, the plurality of first and second passage comprising holes in the baffle, wherein the plurality of first passages form a first set of fluid flow passages when the baffle is positioned in a first orientation with respect to the plasma torch nozzle and plasma torch shield, and wherein the plurality of second passages form a second set of fluid flow passages when the baffle is positioned in a second orientation with respect to the plasma torch nozzle and plasma torch shield.

19. The self-aligning nozzle and shield arrangement of claim 18, wherein the plurality of first fluid flow passages are configured to provide a first flow characteristic to a fluid flowing therethrough, and the plurality of second fluid flow passages are configured to provide a second flow characteristic to a fluid flowing therethrough, the first and second flow characteristics differing from each other.

20. The baffle of claim 19, wherein the plurality of first fluid flow passages are configured to impart swirl of a first magnitude and a first direction to a fluid flowing therethrough, and the plurality of second fluid flow passages are configured to impart swirl of a second magnitude and a second direction to a fluid flowing therethrough.

21. A gas baffle for a plasma torch, comprising:
   an annular member having a plurality of first and second gas passages;
   wherein the plurality of first and second gas passages are arranged such that when the annular member is installed in a first orientation in the plasma torch the first set of gas passages are open to gas flow therethrough and the second set of gas passages are blocked by engagement of one or more baffle walls; and
   wherein the plurality of first and second gas passages are also arranged such that when the annular member is installed in a second orientation in the plasma torch the second set of passages are open to gas flow and the first set of gas passages are blocked by engagement of one or more baffle walls.

22. The gas baffle of claim 21, wherein the first and second sets of gas passages are only partially formed by the annular member.

23. The gas baffle of claim 21, wherein the annular member is configured to be disposed between a nozzle and a shield of the plasma torch, the resulting arrangement configured to modify a flow of shield gas.

24. The gas baffle of claim 21, wherein the annular member is configured to be disposed between a nozzle and an electrode of the plasma torch, the resulting arrangement configured to modify a flow of plasma gas.

25. A nozzle for use with the gas baffle of claim 21, the nozzle including a conical surface for concentrically engaging the annular member.

26. A shield for use with the gas baffle of claim 21, the shield including a conical surface for concentrically engaging the annular member.

27. An electrode assembly for use with the gas baffle of claim 21, the electrode assembly including a conical surface for concentrically engaging the annular member.

* * * * *